United States Patent
Chen et al.

(10) Patent No.: US 11,729,349 B2
(45) Date of Patent: Aug. 15, 2023

(54) METHOD, ELECTRONIC DEVICE, AND COMPUTER PROGRAM PRODUCT FOR VIDEO PROCESSING

(71) Applicant: EMC IP Holding Company LLC, Hopkinton, MA (US)

(72) Inventors: Qiang Chen, Shanghai (CN); Pedro Fernandez Orellana, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/400,350

(22) Filed: Aug. 12, 2021

(65) Prior Publication Data

US 2023/0027981 A1    Jan. 26, 2023

(30) Foreign Application Priority Data

Jul. 23, 2021 (CN) .......................... 202110837055.8

(51) Int. Cl.
*H04N 7/01* (2006.01)
*H04N 21/238* (2011.01)

(52) U.S. Cl.
CPC ......... *H04N 7/0125* (2013.01); *H04N 21/238* (2013.01)

(58) Field of Classification Search
CPC .. H04N 7/0125; H04N 21/238; H04N 7/0117; H04N 21/23418; H04N 21/23614; H04N 21/251; H04N 21/4356; H04N 21/845; H04N 21/234363; G06V 20/41
See application file for complete search history.

(56) References Cited

U.S. PATENT DOCUMENTS

| | | | |
|---|---|---|---|
| 10,701,394 B1* | 6/2020 | Caballero | G06N 3/08 |
| 2013/0169863 A1* | 7/2013 | Smith | H04N 7/01 348/441 |
| 2018/0139458 A1* | 5/2018 | Wang | H04N 19/59 |
| 2019/0130530 A1 | 5/2019 | Schroers et al. | |

(Continued)

OTHER PUBLICATIONS

Wikipedia, "Google Stadia," https://en.wikipedia.org/wiki/Google_Stadia, Aug. 11, 2021, 15 pages.

(Continued)

*Primary Examiner* — Adil Ocak
(74) *Attorney, Agent, or Firm* — Ryan, Mason & Lewis, LLP

(57) ABSTRACT

Illustrative embodiments include a method, an electronic device, and a computer program product for video processing. In the method, a first group of image frames in a first video having a first resolution is converted into a second group of image frames having a second resolution, the first resolution being higher than the second resolution; a second video having the second resolution is generated based on the second group of image frames; conversion parameters for the second video are determined based on the first group of image frames and the second group of image frames, the conversion parameters being used to convert an image frame in the second group of image frames into an image frame having a third resolution, and the third resolution being higher than the second resolution; and the conversion parameters and the second video are sent to a requester of the first video.

16 Claims, 8 Drawing Sheets

(56) References Cited

U.S. PATENT DOCUMENTS

2020/0162789 A1\* 5/2020 Ma ................ H04N 21/440263
2021/0006782 A1\* 1/2021 Ramchandran ........ H04N 19/59

OTHER PUBLICATIONS

Wikipedia, "Video Super Resolution," https://en.wikipedia.org/wiki/Video_Super_Resolution, Jun. 27, 2021, 18 pages.
Amazon Web Services, "AI Video Super Resolution," https://www.amazonaws.cn/en/solutions/ai-super-resolution-on-aws/, Feb. 2020, 6 pages.
Wikipedia, "GeForce Now," https://en.wikipedia.org/wiki/GeForce_Now, Jun. 6, 2021, 5 pages.
Wikipedia, "Xbox Cloud Gaming," https://en.wikipedia.org/wiki/Xbox_Cloud_Gaming, Aug. 9, 2021, 7 pages.
C. Faulkner, "Microsoft's xCloud game streaming is now widely available on iOS and PC," https://www.theverge.com/2021/6/28/22554267/microsoft-xcloud-game-streaming-xbox-pass-ios-iphone-ipad-pc, Jun. 28, 2021, 4 pages.
Wikipedia, "Nvidia Shield TV," https://en.wikipedia.org/wiki/Nvidia_Shield_TV, Jun. 24, 2021, 3 pages.

\* cited by examiner

METHOD, ELECTRONIC DEVICE, AND COMPUTER PROGRAM PRODUCT FOR VIDEO PROCESSING

RELATED APPLICATION(S)

The present application claims priority to Chinese Patent Application No. 202110837055.8, filed Jul. 23, 2021, and entitled "Method, Electronic Device, and Computer Program Product for Video Processing," which is incorporated by reference herein in its entirety.

FIELD

Embodiments of the present disclosure relate to the field of video transmission, and more particularly, to a method, an electronic device, and a computer program product for video processing.

BACKGROUND

Today, video content accounts for a considerable proportion of global Internet business. This makes reducing bandwidth usage one of the critical factors that drive the development of the Internet. Typically, video transmission is a main pressure on backbone networks and Internet service providers. Recently, many video content providers have lowered the quality of streaming videos of their services to relieve the pressures of Internet service providers.

SUMMARY

In a first aspect of the present disclosure, a method for video processing is provided. The method includes converting a first group of image frames in a first video having a first resolution into a second group of image frames having a second resolution, the first resolution being higher than the second resolution. The method further includes generating a second video having the second resolution based on the second group of image frames. The method further includes determining conversion parameters for the second video based on the first group of image frames and the second group of image frames, the conversion parameters being used to convert an image frame in the second group of image frames into an image frame having a third resolution, and the third resolution being higher than the second resolution. The method further includes sending the conversion parameters and the second video to a requester of the first video.

In a second aspect of the present disclosure, an electronic device is provided. The electronic device includes a processor and a memory coupled to the processor, the memory having instructions stored therein which, when executed by the processor, cause the device to execute actions. The actions include converting a first group of image frames in a first video having a first resolution into a second group of image frames having a second resolution, the first resolution being higher than the second resolution. The actions further include generating a second video having the second resolution based on the second group of image frames. The actions further include determining conversion parameters for the second video based on the first group of image frames and the second group of image frames, the conversion parameter being used to convert an image frame in the second group of image frames into an image frame having a third resolution, and the third resolution being higher than the second resolution. The actions further include sending the conversion parameters and the second video to a requester of the first video.

In a third aspect of the present disclosure, a method for video processing is provided. The method includes receiving, from a provider of a first video having a first resolution, a second video having a second resolution converted from the first video and conversion parameters for the second video, the first resolution being higher than the second resolution, and the conversion parameters being determined based on a first group of image frames in the first video and a second group of image frames in the second video. The method further includes converting, using the conversion parameters, the second group of image frames into a third group of image frames having a third resolution, the third resolution being higher than the second resolution. The method further includes generating a third video having the third resolution based on the third group of image frames to respond to a request for the first video.

In a fourth aspect of the present disclosure, an electronic device is provided. The electronic device includes a processor and a memory coupled to the processor, the memory having instructions stored therein which, when executed by the processor, cause the device to execute actions. The actions include receiving, from a provider of a first video having a first resolution, a second video having a second resolution converted from the first video and conversion parameters for the second video, the first resolution being higher than the second resolution, and the conversion parameters being determined based on a first group of image frames in the first video and a second group of image frames in the second video. The actions further include converting, using the conversion parameters, the second group of image frames into a third group of image frames having a third resolution, the third resolution being higher than the second resolution. The actions further include generating a third video having the third resolution based on the third group of image frames to respond to a request for the first video.

In a fifth aspect of the present disclosure, a computer program product is provided. The computer program product is tangibly stored on a computer-readable medium and includes machine-executable instructions. The machine-executable instructions, when executed, cause a machine to perform the method according to the first aspect.

In a sixth aspect of the present disclosure, a computer program product is provided. The computer program product is tangibly stored on a computer-readable medium and includes machine-executable instructions. The machine-executable instructions, when executed, cause a machine to perform the method according to the third aspect.

This Summary is provided to introduce the selection of concepts in a simplified form, which will be further described in the Detailed Description below. The Summary is neither intended to identify key features or primary features of the present disclosure, nor intended to limit the scope of the present disclosure.

BRIEF DESCRIPTION OF THE DRAWINGS

The above and other objectives, features, and advantages of the present disclosure will become more apparent from the following description of example embodiments of the present disclosure with reference to the accompanying drawings. In the example embodiments of the present disclosure, the same reference numerals generally represent the same elements. In the accompanying drawings.

DETAILED DESCRIPTION

The principles of the present disclosure will be described below with reference to several example embodiments shown in the accompanying drawings. Although illustrative embodiments of the present disclosure are shown in the accompanying drawings, it should be understood that these embodiments are described merely to enable those skilled in the art to better understand and then implement the present disclosure, and do not to limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

Figure 1:
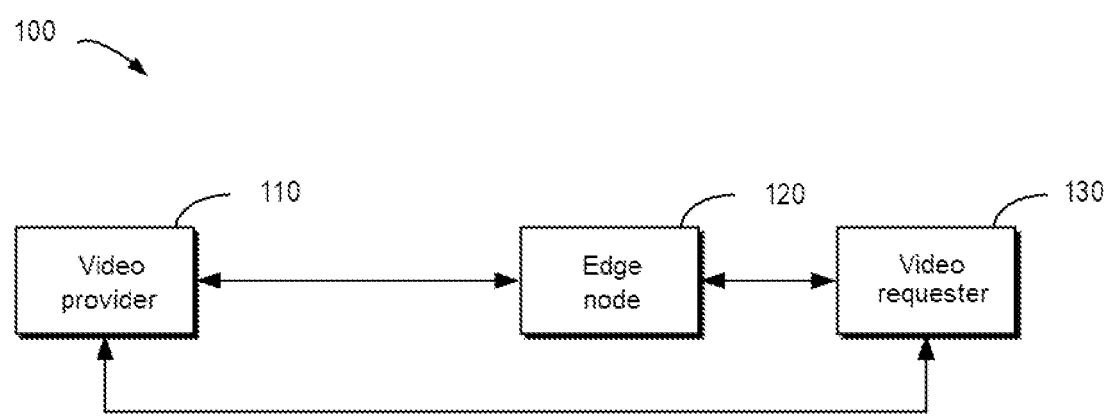
FIG. 1 illustrates a schematic diagram of an example environment in which an embodiment of the present disclosure may be implemented.

FIG. 1 illustrates a schematic diagram of example environment 100 in which the embodiment of the present disclosure may be implemented. As shown in FIG. 1, environment 100 includes video provider 110, edge node 120, and video requester 130. Video provider 110 may be, for example, a cloud server, a data center, etc. Video provider 110 may process a video (e.g., reduce a resolution), and then send the processed video to reduce network bandwidth usage.

Video requester 130 may interact with a user (not shown). Video requester 130 may be, for example, a mobile phone, a tablet computer, a desktop computer, a laptop, a game machine, etc. In some embodiments, video requester 130 and edge node 120 may be arranged together. In some embodiments, video requester 130 may be arranged separately from edge node 120, but they may communicate with each other. Video requester 130 may communicate directly with video provider 110, or may communicate with video provider 110 via edge node 120.

Edge node 120 may be one or more edge devices that may be used for edge storage and edge computing. For example, when video requester 130 issues a video transmission request to video provider 110, a requested video may be processed by video provider 110 (e.g., to reduce a resolution) before being sent to edge node 120 adjacent to video requester 130. Edge node 120 restores the received video and then transmits same to video requester 130. However, it is not limited thereto, and the requested video may also be sent directly to video requester 130 after being processed by video provider 110, and will be restored at video requester 130.

It should be understood that the structure and functions of environment 100 are described for illustrative purposes only and do not imply any limitation to the scope of the present disclosure. For example, the embodiments of the present disclosure may also be applied to an environment different from environment 100.

In a known conventional solution, a trained model is usually used during restoring of the received video. The model needs to use a large amount of training data in a training phase, making the model more universal. Because the amount of training data is large, training is a complicated process and is difficult to converge. Moreover, a model trained like this is usually exceptionally large, and during restoring of a video using such a model, dedicated hardware (e.g., a high performance graphics processing unit (GPU)) is required, thereby increasing the cost of the hardware configuration.

Additionally, since it is difficult for the above universal model to learn infinitely changing patterns from different training data, the quality of a video restored according to the above model is not good. Critical information may be lost in image frames of the restored video.

Illustrative embodiments of the present disclosure provide a solution for video processing, which, considered from a model training aspect, improves the quality of a restored video while ensuring low bandwidth usage.

According to various embodiments of the present disclosure, a first group of image frames in a first video having a first resolution is converted into a second group of image frames having a second resolution. The first resolution is higher than the second resolution. Then, a second video is generated based on the second group of image frames. Next, conversion parameters for the second video are determined based on the above first group of image frames and the above second group of image frames. The conversion parameters are used to convert an image frame in the second group of image frames into an image frame having a third resolution, and the third resolution is higher than the above second resolution. Finally, the above conversion parameters and the above second video are sent to a requester of the above first video.

According to the embodiment described herein, conversion parameters dedicated to a video to be transmitted are transmitted along with the video to be transmitted so that the video may be restored by a receiver using the dedicated conversion parameters. Compared with restoration performed using a conventional universal model, the restored video has higher quality and can retain more information from the original video. Moreover, because the number of dedicated conversion parameters is small, no dedicated hardware is required for the restoration, thereby reducing the cost of the hardware configuration. In addition, because the dedicated conversion parameters are determined for a video to be transmitted, computing complexity is lowered and computing cost is reduced in the process of determining the conversion parameters.

The basic principles and several example implementations of the present disclosure are described below with reference to FIGS. 2 to 9. It should be understood that these example embodiments are given only to enable those skilled in the art to better understand and thus implement the embodiments of the present disclosure, and are not intended to limit the scope of the present disclosure in any way.

Figure 2:
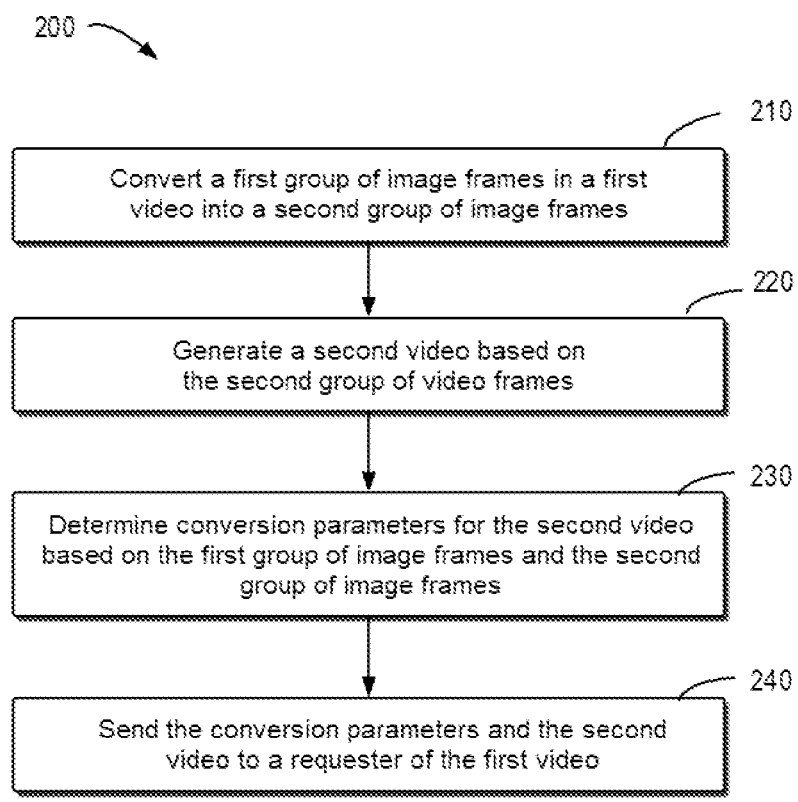
FIG. 2 illustrates a flow chart of an example method for video processing according to an embodiment of the present disclosure.

FIG. 2 illustrates a flow chart of example method 200 for video processing according to an embodiment of the present disclosure. Method 200 may be, for example, performed by video provider 110 as shown in FIG. 1. It should be understood that method 200 may also include additional actions not shown and/or may omit actions shown, and the scope of the present disclosure is not limited in this regard. Method 200 is described in detail below with reference to FIGS. 1 and 4.

In the embodiment of the present disclosure, video requester 130 requests a first video from video provider 110. In video provider 110, the first video having a first resolution is split into a first group of image frames having the first resolution. At block 210, the first group of image frames in the first video is converted into a second group of image frames having a second resolution. The first resolution is higher than the second resolution.

Figure 4:
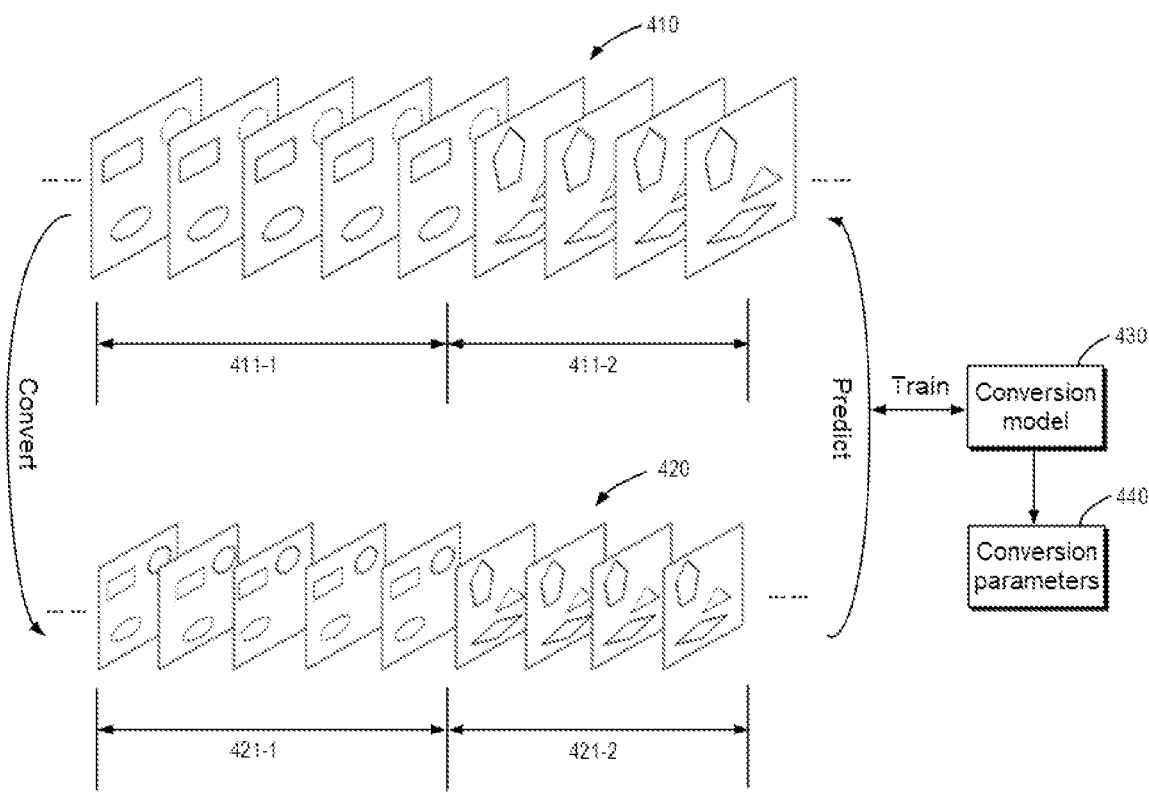
FIG. 4 is a schematic diagram illustrating the determination of conversion parameters based on a first group of image frames and a second group of image frames according to an embodiment of the present disclosure.

For example, the first group of image frames in the first video may be a group of image frames 410 as shown in FIG. 4. By reducing the resolution of first group of image frames 410, second group of image frames 420 as shown in FIG. 4 is obtained. FIG. 4 is a schematic diagram illustrating the determination of conversion parameters 440 based on first group of image frames 410 and second group of image frames 420 according to an embodiment of the present disclosure. The number of image frames shown in FIG. 4 is merely exemplary. As shown by the ellipsis in FIG. 4, there may be more image frames.

In some embodiments, a known algorithm, such as a downsampling algorithm common in a deep convolutional neural network, may be used to reduce a resolution. In some embodiments, the resolution may be reduced using a dedicated algorithm for a requested video (e.g., a first video). Depending on the algorithm, the effect of converting an image frame into a lower resolution image frame will be different, for example, more information or less information is lost. By optimizing the algorithm (e.g., a downsampling algorithm in a deep convolutional neural network) to make it a dedicated algorithm for the requested video, the effect of reducing the resolution may be the best. For example, the image frame with a reduced resolution retains more critical information. The dedicated algorithm for reducing resolution is not repeated here.

Returning to FIG. 2, at block 220, a second video is generated based on the second group of image frames. The second video has the above second resolution. For example, the second video (not shown) may be generated based on second group of image frames 420 shown in FIG. 4. The resolution of the second video is lower than the resolution of the first video.

At block 230, conversion parameters for the second video are determined based on the first group of image frames and the second group of image frames. The conversion parameters are used to convert an image frame in the above second group of image frames having the second resolution into an image frame having a third resolution. The third resolution is higher than the second resolution. The third resolution may be the same as the first resolution, or may be different from the first resolution. The embodiment for converting the second video using the conversion parameters will be described in detail below with reference to FIGS. 6 to 8.

In some embodiments, for example, the conversion parameters dedicated to converting the second video may be determined based on respective corresponding relationships between image frames in first group of image frames 410 and image frames in second group of image frames 420 as shown in FIG. 4.

In some embodiments, scenes may be further distinguished so as to determine the above conversion parameters based on the first group of image frames and the second group of image frames having the same scene. Such an embodiment will be described in detail below with reference to FIGS. 3 and 4.

In some embodiments, the first group of image frames and the second group of image frames may also be taken as training data to train a conversion model. Parameters of the conversion model are then determined as conversion parameters dedicated to converting the second video. Such an embodiment will be described in detail below with reference to FIGS. 4 and 5.

At block 240, the determined conversion parameters and the above second video are sent to a requester of the first video (e.g., video requester 130). In some embodiments, the second video may be streamed to video requester 130.

In this way, a large universal model may be trained without the need for excessively large amounts of training data, thus reducing the computing cost. Moreover, because the number of conversion parameters is small, a small amount of bandwidth is used for transmission to a video requester.

Figure 3:
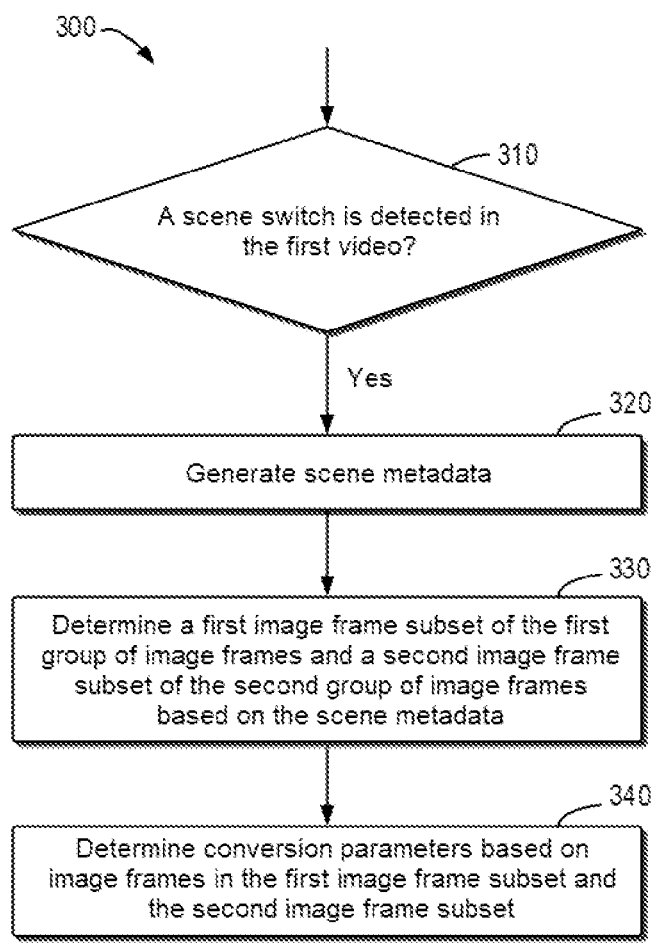
FIG. 3 illustrates a flow chart of a method for determining conversion parameters by distinguishing scenes according to some embodiments of the present disclosure.

FIG. 3 illustrates a flow chart of method 300 for determining conversion parameters by distinguishing scenes according to some embodiments of the present disclosure. Method 300 may be regarded as an example implementation of block 230 in method 200. It should be understood that method 300 may further include additional actions not shown and/or may omit actions shown. The scope of the present disclosure is not limited in this aspect. Method 300 is described in detail below with reference to FIG. 4.

At block 310, if a scene switch ("Yes" in block 310) is detected in the first video, then scene metadata is generated at block 320. The scene metadata may indicate a position of the scene switch in the first video.

In some embodiments, it is possible to determine whether there is a scene switch in the first video by detecting similarity between two adjacent frames of the first group of image frames in the first video. For example, if the similarity between the two adjacent frames is lower than a threshold, it is determined that a scene switch is detected in the first video. The scene metadata may then indicate positions of the above two adjacent frames in the first video, whose similarity is lower than the threshold. It should be understood that the above embodiment for detecting a scene switch is merely exemplary and is not intended to limit the present disclosure. In some embodiments, other scene switch detection methods may also be used.

At block 330, a first image frame subset of the first group of image frames and a second image frame subset of the second group of image frames are determined based on the scene metadata. Image frames in the first image frame subset and the second image frame subset have the same scene.

For example, as shown in FIG. 4, one first image frame subset 411-1 of first group of image frames 410 and one second image frame subset 421-1 of second group of image frames 420 may be determined based on scene metadata (not shown). Image frames in first image frame subset 411-1 and second image frame subset 421-1 have the same scene.

Based on the scene metadata, it is also possible to determine first image frame subset 411-2 of first group of image frames 410 and second image frame subset 421-2 of second group of image frames 420. Image frames in first image frame subset 411-2 and second image frame subset 421-2 also have the same scene, but their scene is different from the scene of the image frames in first image frame subset 411-1 and second image frame subset 421-1. Although only two image frame subsets of each of first group of image frames 410 and second group of image frames 420 are shown in FIG. 4, it is not limited thereto. In some embodiments, it is also possible to determine more or fewer image frame subsets based on scene metadata.

At block 340, the conversion parameters are determined based on image frames in the first image frame subset and the second image frame subset. In some embodiments, the conversion parameters may be determined based on respective corresponding relationships between the image frames in the first image frame subset and the second image frame subset. For example, the conversion parameters are determined based on respective corresponding relationships between the image frames in first image frame subset 411-1 and second image frame subset 421-1 as shown in FIG. 4.

In some embodiments, the first image frame subset and the second image frame subset may also be taken as training data to train a conversion model for scene distinguishing. Parameters of the conversion model are then determined as conversion parameters. For example, first image frame subsets 411-1, 411-2 and second image frame subsets 421-1, 421-2 as shown in FIG. 4 may be taken as training data to train the conversion model 430 for scene distinguishing. Parameters of the conversion model are determined as conversion parameters 440.

In this way, scenes in a video are distinguished to determine the conversion parameters. When the video is restored using such conversion parameters, the scenes may likewise be distinguished to restore the video, thus making quality of the restored video better.

Figure 5:
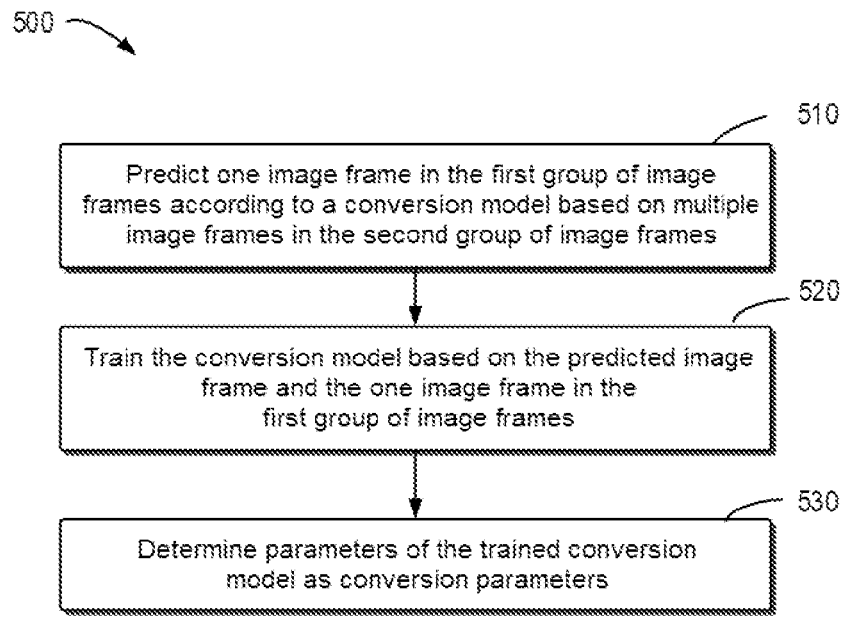
FIG. 5 illustrates a flow chart of a process for determining conversion parameters by training a conversion model according to some embodiments of the present disclosure.

FIG. 5 illustrates a flow chart of method 500 for determining conversion parameters 440 by training conversion model 430 in FIG. 4 according to some embodiments of the present disclosure. Method 500 may be regarded as an example implementation of block 230 in method 200. It should be understood that method 500 may also include additional actions not shown and/or omit actions shown, and the scope of the present disclosure is not limited in this regard. Method 500 is described in detail below with reference to FIG. 4.

At block 510, one image frame in a first group of image frames is predicted according to a conversion model based on a plurality of image frames in a second group of image frames. The conversion model is used to convert an image having the aforementioned second resolution into an image having the aforementioned third resolution.

In some embodiments, for example, one image frame in first group of image frames 410 may be predicted according to conversion model 430 based on one or more image frames in second group of image frames 420 shown in FIG. 4. In some embodiments, one image frame in the first image frame subset (e.g., first image frame subsets 411-1, 411-2 shown in FIG. 4) may also be predicted according to conversion model 430 based on one or more image frames in the second image frame subset (e.g., second image frame subsets 421-1, 421-2 shown in FIG. 4).

At block 520, the conversion model is trained based on a difference between the predicted image frame and the one image frame in the first group of image frames. For example, as shown in FIG. 4, there is a difference between the image frame predicted at block 510 according to conversion model 430 and a target image frame in first group of image frames 410, and the difference is gradually reduced by optimizing conversion model 430. When the difference is reduced to a predetermined threshold, the trained conversion model 430 is obtained.

At block 530, parameters of the trained conversion model are determined as the conversion parameters. For example, parameters of the trained conversion model 430 in FIG. 4 are determined as conversion parameters 440.

Figure 6:
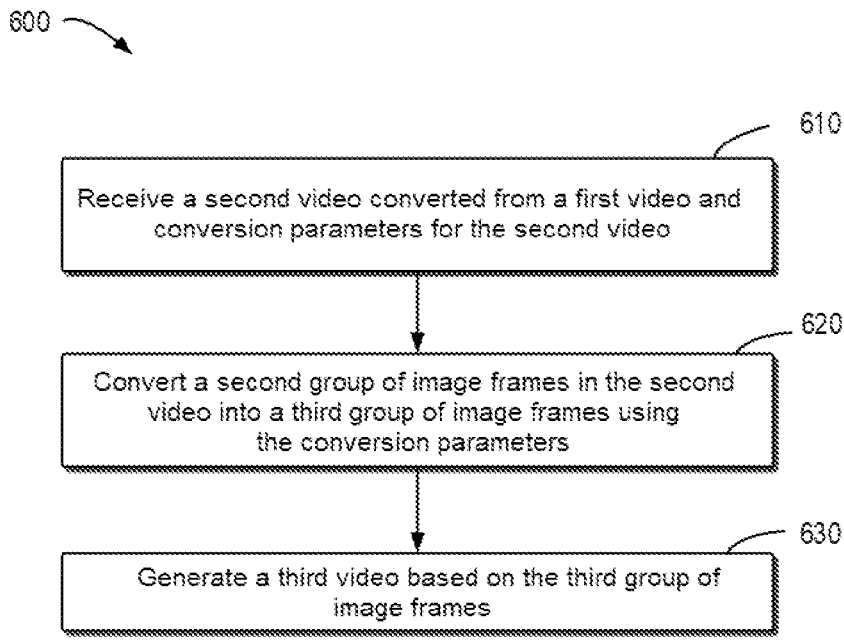
FIG. 6 illustrates a flow chart of an example method for video processing according to another embodiment of the present disclosure.

An embodiment for converting a second video using conversion parameters is described next with reference to FIGS. 6 to 8. FIG. 6 illustrates a flow chart of example method 600 for video processing according to another embodiment of the present disclosure. Method 600 may be performed, for example, by video requester 130 as shown in FIG. 1, or by edge node 120 adjacent to video requester 130. It should be understood that method 600 may also include additional actions not shown and/or may omit actions shown, and the scope of the present disclosure is not limited in this regard. Method 600 is described in detail below with reference to FIGS. 1 and 8. FIG. 8 is a schematic diagram illustrating the conversion of an image frame using dedicated conversion parameters 440 according to another embodiment of the present disclosure.

At block 610 of FIG. 6, video requester 130 or edge node 120 receives, from video provider 110 of a first video having a first resolution, a second video converted from the first video and conversion parameters for the second video. The second video has a second resolution lower than the first resolution. The conversion parameters are conversion parameters determined according to various embodiments above and dedicated to converting the second video. For example, the conversion parameters may be conversion parameters 440 determined based on first group of image frames 410 and second group of image frames 420 in FIG. 4.

At block 620, a second group of image frames is converted into a third group of image frames having a third resolution using the above conversion parameters. For example, by using conversion parameters 440, image frames of second group of image frames 420 may respectively be converted into image frames in third group of image frames 810 having a third resolution as shown in FIG. 8.

The third resolution is higher than the second resolution. The third resolution may be the same as the first resolution, or may be different from the first resolution.

At block 630, a third video is generated based on the third group of image frames having the third resolution.

In some embodiments, for example, as shown in FIG. 8, conversion parameters 440 may be applied to conversion model 830. Conversion model 830 to which conversion parameters 440 are applied is equivalent to conversion model 430 as shown in FIG. 4. Therefore, conversion model 830, like conversion model 430, is used to convert an image having the second resolution into an image having the third resolution. One image frame in third group of image frames 810 is then generated according to conversion model 830 based on one or more image frames in second group of image frames 420.

In this way, because dedicated conversion parameters are used in the process of restoring a video, the quality of the restored video can be improved while low bandwidth usage by a video transmission is ensured. Moreover, because the number of the dedicated conversion parameters is small, no dedicated hardware is required for the restoration, thereby reducing the cost of the hardware configuration.

Figure 7:
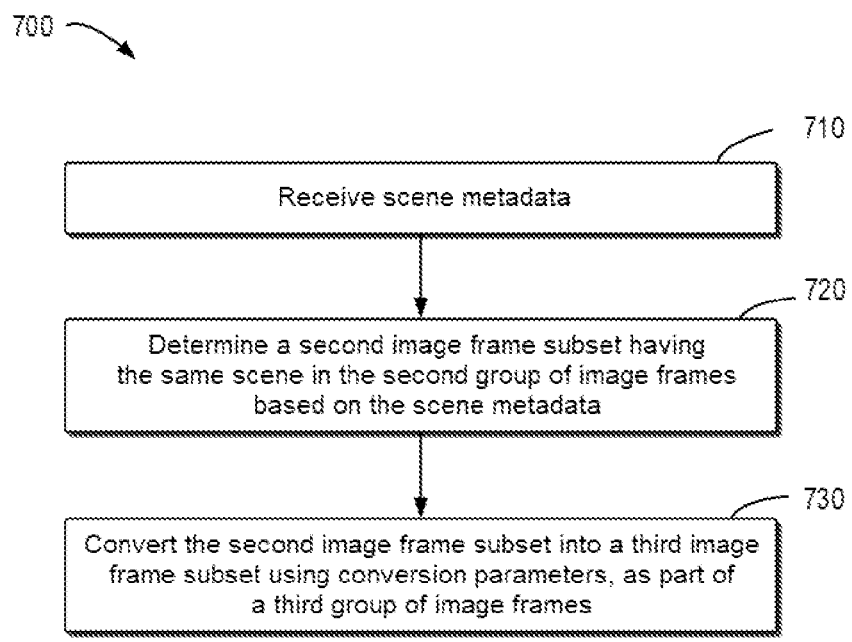
FIG. 7 illustrates a flow chart of a method for converting an image frame by distinguishing scenes according to some embodiments of the present disclosure.
Figure 8:
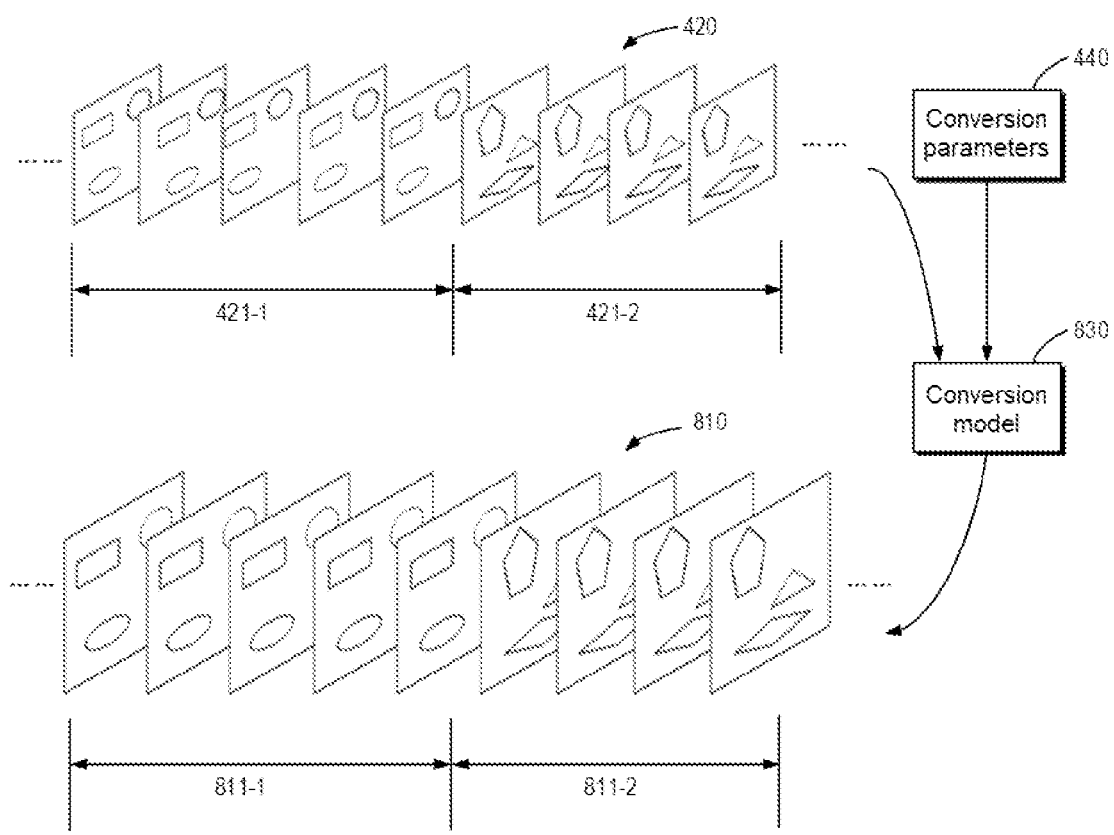
FIG. 8 is a schematic diagram illustrating the conversion of an image frame using dedicated conversion parameters according to another embodiment of the present disclosure.

FIG. 7 illustrates a flow chart of method 700 for converting an image frame by distinguishing scenes according to some embodiments of the present disclosure. Method 700 may be regarded as an example implementation of block 620 in method 600. It should be understood that method 700 may further include an additional action that is not shown and/or may omit an action that is shown, and the scope of the present disclosure is not limited in this regard. Method 700 is described in detail below with reference to FIG. 8.

At block 710, scene metadata is received. The scene metadata may indicate a position of a scene switch in the first video.

At block 720, a second image frame subset having the same scene in a second group of image frames is determined based on the scene metadata. For example, as shown in FIG. 8, it is possible to determine second image frame subset 421-1 of second group of image frames 420 based on scene metadata (not shown). Image frames in second image frame subset 421-1 have the same scene.

It is also possible to determine second image frame subset 421-2 of second group of image frames 420 based on the scene metadata. Image frames in second image frame subset 421-2 also have the same scene, but their scene is different from the scene of the image frames in second image frame subset 421-1. Although only two image frame subsets of second group of image frames 420 are shown in FIG. 8, it is not limited thereto. In some embodiments, it is also possible to determine more or fewer image frame subsets based on scene metadata.

At block 730, the second image frame subset is converted into a third image frame subset having a third resolution using conversion parameters, as part of a third group of image frames. For example, second image frame subset 421-1 in FIG. 8 may be converted into third image frame subset 811-1 using conversion parameters 440. Second image frame subset 421-2 is converted into third image frame subset 811-2. Third image frame subset 811-1 and third image frame subset 811-2 may be taken as part of third group of image frames 810.

In some embodiments, for example, as shown in FIG. 8, conversion parameters 440 may be applied to conversion model 830. One image frame in third image frame subset 811-1 is generated according to conversion model 830 based on one or more image frames in second image frame subset 421-1. One image frame in third image frame subset 811-2 is generated according to conversion model 830 based on one or more image frames in second image frame subset 421-2. Third image frame subset 811-1 and third image frame subset 811-2 are then taken as part of third group of image frames 810.

Although only two converted image frame subsets of third group of image frames 810 are shown in FIG. 8, it is not limited thereto.

In this way, restoration of a video using cross-scene image frames is avoided, so that quality of the restored video is better.

Figure 9:
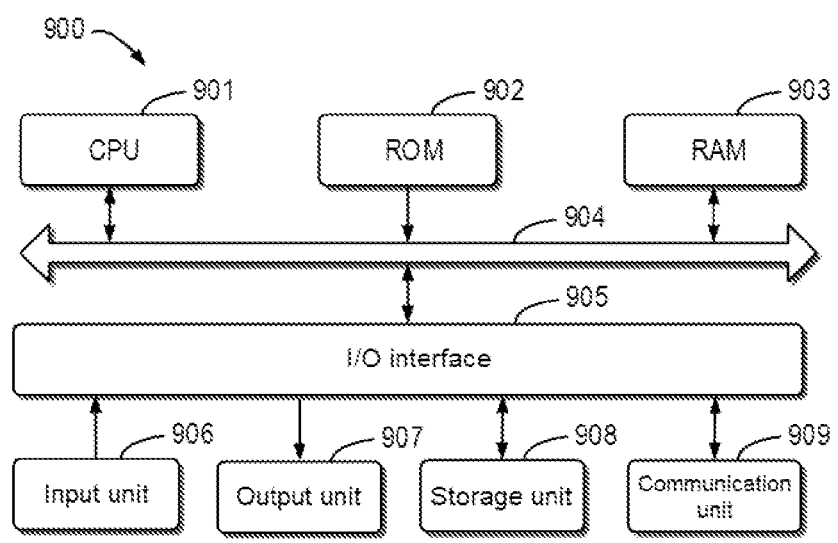
FIG. 9 illustrates a block diagram of an example device that may be configured to implement an embodiment of the present disclosure.

FIG. 9 shows a schematic block diagram of example device 900 that may be configured to implement the embodiments of the present disclosure. For example, video provider 110, edge node 120, and video requester 130 as shown in FIG. 1 may be implemented by device 900, separately. As shown in FIG. 9, device 900 includes central processing unit (CPU) 901 that may perform various appropriate actions and processing according to computer program instructions stored in read-only memory (ROM) 902 or computer program instructions loaded from storage unit 908 into random access memory (RAM) 903. Various programs and data required for the operation of device 900 may also be stored in RAM 903. CPU 901, ROM 902, and RAM 903 are connected to each other through bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage unit 908, such as a magnetic disk and an optical disc; and communication unit 909, such as a network card, a modem, and a wireless communication transceiver. Communication unit 909 allows device 900 to exchange information/data with other devices via a computer network, such as the Internet, and/or various telecommunication networks.

The various processes and processing described above, for example, method 200 or method 600, or other methods disclosed herein, may be performed by processing unit 901. For example, in some embodiments, method 200 or method 600 may be implemented as a computer software program that is tangibly included in a machine-readable medium such as storage unit 908. In some embodiments, part or all of the computer program may be loaded and/or installed onto device 900 via ROM 902 and/or communication unit 909. When the computer program is loaded onto RAM 903 and executed by CPU 901, one or more actions of method 200 or method 600 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read only memory (EPROM or flash memory), a static random access memory (SRAM), a portable compact disk read only memory (CD-ROM), a digital versatile disk (DVD), a memory stick, a floppy disk, a mechanical encoding device such as a punch card or a protruding structure within a groove having instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the "C" language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or implemented using a combination of special hardware and computer instructions.

Illustrative embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, so as to enable those of ordinary skill in the art to understand the embodiments disclosed here.

What is claimed is:

1. A method for video processing, comprising:
converting a first group of image frames in a first video having a first resolution into a second group of image frames having a second resolution, the first resolution being higher than the second resolution;
generating a second video having the second resolution based on the second group of image frames;
determining conversion parameters for the second video based on the first group of image frames and the second group of image frames, the conversion parameters being used to convert an image frame in the second group of image frames into an image frame having a third resolution, and the third resolution being higher than the second resolution; and
sending the conversion parameters and the second video to a requester of the first video;
wherein the conversion parameters are determined responsive to the generation of the second video; and
wherein sending the conversion parameters and the second video to the requester of the first video comprises streaming the conversion parameters in combination with the second video to the requester.

2. The method according to claim 1, wherein determining the conversion parameters comprises:
  if a scene switch is detected in the first video, generating scene metadata, the scene metadata indicating a position of the scene switch in the first video; and
  determining a first image frame subset of the first group of image frames and a second image frame subset of the second group of image frames based on the scene metadata, image frames in the first image frame subset and the second image frame subset having the same scene; and
  determining the conversion parameters based on the image frames in the first image frame subset and the second image frame subset.

3. The method according to claim 2, further comprising:
  sending the scene metadata to the requester of the first video.

4. The method according to claim 1, wherein determining the conversion parameters based on the first group of image frames and the second group of image frames comprises:
  predicting, according to a conversion model, one image frame in the first group of image frames based on multiple image frames in the second group of image frames, the conversion model being used to convert an image having the second resolution into an image having the third resolution;
  training the conversion model based on a difference between the predicted image frame and the one image frame in the first group of image frames; and
  determining parameters of the trained conversion model as the conversion parameters.

5. A computer program product tangibly stored on a computer-readable medium and comprising machine-executable instructions, the machine-executable instructions, when executed, causing a machine to perform the method of claim 1.

6. A method for video processing, comprising:
  receiving, from a provider of a first video having a first resolution, a second video having a second resolution converted from the first video and conversion parameters for the second video, the first resolution being higher than the second resolution, and the conversion parameters being determined based on a first group of image frames in the first video and a second group of image frames in the second video;
  converting, using the conversion parameters, the second group of image frames into a third group of image frames having a third resolution, the third resolution being higher than the second resolution; and
  generating a third video having the third resolution based on the third group of image frames to respond to a request for the first video;
  wherein the conversion parameters are determined responsive to the generation of the second video; and
  wherein the conversion parameters in combination with the second video are streamed from the provider of the first video.

7. The method according to claim 6, wherein converting the second group of image frames into the third group of image frames comprises:
  receiving scene metadata from the provider, the scene metadata indicating a position of a scene switch in the first video;
  determining a second image frame subset having the same scene in the second group of image frames based on the scene metadata; and
  converting, using the conversion parameters, the second image frame subset into a third image frame subset having the third resolution, as part of the third group of image frames.

8. The method according to claim 6, wherein converting, using the conversion parameters, the second group of image frames into the third group of image frames comprises:
  applying the conversion parameters to a conversion model, the conversion model being used to convert an image having the second resolution into an image having the third resolution; and
  generating, according to the conversion model, one image frame in the third group of image frames based on multiple image frames in the second group of image frames.

9. A computer program product tangibly stored on a computer-readable medium and comprising machine-executable instructions, the machine-executable instructions, when executed, causing a machine to perform the method of claim 6.

10. An electronic device, comprising:
  a processor; and
  a memory coupled to the processor, the memory having instructions stored therein that, when executed by the processor, cause the electronic device to execute actions comprising:
  converting a first group of image frames in a first video having a first resolution into a second group of image frames having a second resolution, the first resolution being higher than the second resolution;
  generating a second video having the second resolution based on the second group of image frames;
  determining conversion parameters for the second video based on the first group of image frames and the second group of image frames, the conversion parameters being used to convert an image frame in the second group of image frames into an image frame having a third resolution, and the third resolution being higher than the second resolution; and
  sending the conversion parameters and the second video to a requester of the first video;
  wherein the conversion parameters are determined responsive to the generation of the second video; and
  wherein sending the conversion parameters and the second video to the requester of the first video comprises streaming the conversion parameters in combination with the second video to the requester.

11. The electronic device according to claim 10, wherein determining the conversion parameters comprises:
  if a scene switch is detected in the first video, generating scene metadata, the scene metadata indicating a position of the scene switch in the first video; and
  determining a first image frame subset of the first group of image frames and a second image frame subset of the second group of image frames based on the scene metadata, image frames in the first image frame subset and the second image frame subset having the same scene; and
  determining the conversion parameters based on the image frames in the first image frame subset and the second image frame subset.

12. The electronic device according to claim 11, wherein the actions further comprise:
  sending the scene metadata to the requester of the first video.

13. The electronic device according to claim 10, wherein determining the conversion parameters based on the first group of image frames and the second group of image frames comprises:

predicting, according to a conversion model, one image frame in the first group of image frames based on multiple image frames in the second group of image frames, the conversion model being used to convert an image having the second resolution into an image having the third resolution;

training the conversion model based on a difference between the predicted image frame and the one image frame in the first group of image frames; and determining parameters of the trained conversion model as the conversion parameters.

14. An electronic device, comprising:

a processor; and a memory coupled to the processor, the memory having instructions stored therein that, when executed by the processor, cause the electronic device to execute actions comprising:

receiving, from a provider of a first video having a first resolution, a second video having a second resolution converted from the first video and conversion parameters for the second video, the first resolution being higher than the second resolution, and the conversion parameters being determined based on a first group of image frames in the first video and a second group of image frames in the second video;

converting, using the conversion parameters, the second group of image frames into a third group of image frames having a third resolution, the third resolution being higher than the second resolution; and generating a third video having the third resolution based on the third group of image frames to respond to a request for the first video;

wherein the conversion parameters are determined responsive to the generation of the second video; and wherein the conversion parameters in combination with the second video are streamed from the provider of the first video.

15. The electronic device according to claim 14, wherein converting the second group of image frames into the third group of image frames comprises:

receiving scene metadata from the provider, the scene metadata indicating a position of a scene switch in the first video;

determining a second image frame subset having the same scene in the second group of image frames based on the scene metadata; and converting, using the conversion parameters, the second image frame subset into a third image frame subset having the third resolution as part of the third group of image frames.

16. The electronic device according to claim 14, wherein converting, using the conversion parameters, the second group of image frames into the third group of image frames comprises:

applying the conversion parameters to a conversion model, the conversion model being used to convert an image having the second resolution into an image having the third resolution; and generating, according to the conversion model, one image frame in the third group of image frames based on multiple image frames in the second group of image frames.

\* \* \* \* \*